US010741853B2

(12) United States Patent
Horimoto et al.

(10) Patent No.: US 10,741,853 B2
(45) Date of Patent: Aug. 11, 2020

(54) GASKET AND MANUFACTURING METHOD THEREFOR

(71) Applicant: NOK CORPORATION, Tokyo (JP)

(72) Inventors: Takayuki Horimoto, Kanagawa (JP); Hajime Yui, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 127 days.

(21) Appl. No.: 15/780,876

(22) PCT Filed: Dec. 1, 2016

(86) PCT No.: PCT/JP2016/085671
§ 371 (c)(1),
(2) Date: Jun. 1, 2018

(87) PCT Pub. No.: WO2017/094815
PCT Pub. Date: Jun. 8, 2017

(65) Prior Publication Data
US 2018/0347700 A1  Dec. 6, 2018

(30) Foreign Application Priority Data
Dec. 3, 2015  (JP) .................. 2015-236458

(51) Int. Cl.
*H01M 8/0271* (2016.01)
*F16J 15/06* (2006.01)
(Continued)

(52) U.S. Cl.
CPC ......... *H01M 8/0271* (2013.01); *F16J 15/061* (2013.01); *F16J 15/102* (2013.01);
(Continued)

(58) Field of Classification Search
CPC .... B32B 2581/00; F16J 15/061; F16J 15/104; F16J 15/108; H01M 8/0273; H01M 8/0276; H01M 8/0286
See application file for complete search history.

(56) References Cited

U.S. PATENT DOCUMENTS 4,748,092 A * 5/1988 Hekal ................. H01M 8/0273
                                                    204/253
7,001,686 B2 * 2/2006 Wells .................. H01M 8/0204
                                                    429/535
(Continued)

FOREIGN PATENT DOCUMENTS

CN  101032046  9/2007
CN  101091078  12/2007
(Continued)

OTHER PUBLICATIONS

Machine Translation of JP 2002-471610 retreived from https://worldwide.espacenet.com Dec. 3, 2019.*
(Continued)

*Primary Examiner* — Nicholas L Foster
(74) *Attorney, Agent, or Firm* — Greenblum & Bernstein, P.L.C.

(57) ABSTRACT

The purpose of the present invention is to provide a structure which is configured so that the handling workability of a rubber-only gasket is improved and, even when a gasket body and a carrier film adhere to each other, the carrier film is easily detached from the gasket body. To achieve the object, a rubber-only gasket body and a carrier film containing a resin film detachably holding the gasket body are combined and a gasket holding portion containing a three-dimensional shape deformed along an outer shape of the gasket body is provided in a portion overlapping with the gasket body on the plane in the carrier film. The gasket holding portion containing the three-dimensional shape has
(Continued)

a stepped shape in which one side surface of the gasket body is not held and only the other side surface and the lower surface of the gasket body are held.

5 Claims, 5 Drawing Sheets

(51) Int. Cl.
*F16J 15/10* (2006.01)
*H01M 8/0286* (2016.01)
*H01M 8/0273* (2016.01)

(52) U.S. Cl.
CPC ......... *F16J 15/104* (2013.01); *H01M 8/0273* (2013.01); *H01M 8/0286* (2013.01); *F16J 15/108* (2013.01)

(56) References Cited

U.S. PATENT DOCUMENTS

| | | | | |
|---|---|---|---|---|
| 8,304,119 | B2* | 11/2012 | Kurano | F16J 15/0806 |
| | | | | 277/317 |
| 10,350,799 | B2* | 7/2019 | Saso | F16J 15/106 |
| 10,465,798 | B2* | 11/2019 | Saso | H01M 8/0271 |
| 2004/0075224 | A1* | 4/2004 | Kuroki | F16J 15/0818 |
| | | | | 277/650 |
| 2005/0077683 | A1* | 4/2005 | Comert | B60R 13/06 |
| | | | | 277/300 |
| 2006/0131819 | A1* | 6/2006 | Kurano | F16J 15/0806 |
| | | | | 277/628 |
| 2009/0075143 | A1* | 3/2009 | Kurano | F16J 15/0806 |
| | | | | 429/407 |
| 2018/0099439 | A1* | 4/2018 | Saso | F16J 15/061 |
| 2018/0104872 | A1* | 4/2018 | Kurano | H01M 8/0276 |
| 2018/0163869 | A1* | 6/2018 | Saso | F16J 15/0806 |
| 2018/0163870 | A1* | 6/2018 | Saso | B29C 44/586 |
| 2018/0313448 | A1* | 11/2018 | Nishimura | H01M 8/0273 |

FOREIGN PATENT DOCUMENTS

| | | |
|---|---|---|
| JP | 54-159552 | 12/1979 |
| JP | 2002-147610 | 5/2002 |
| JP | 2005-003181 | 1/2005 |
| JP | 2006-161986 | 6/2006 |
| JP | 2010-174146 | 8/2010 |
| JP | 2014-60133 | 4/2014 |
| JP | 3194843 | 12/2014 |

OTHER PUBLICATIONS

Office Action issued in China Counterpart Patent Appl. No. 201680059988.6, dated Apr. 30, 2019.
Official Communication issued in International Bureau of WIPO Patent Application No. PCT/JP2016/085671, dated Mar. 7, 2017.
Official Communication issued in European Patent Office (EPO) Patent Application No. 16870752.9, dated Nov. 2, 2018.

* cited by examiner

GASKET AND MANUFACTURING METHOD THEREFOR

BACKGROUND OF THE INVENTION

Field of the Invention

The present invention relates to a gasket relating to a sealing technique and a manufacturing method therefor. The gasket of the present invention is used as a fuel cell gasket, for example, or used as a common gasket for the other uses.

Description of the Conventional Art

Mentioned as the fuel cell gasket are gaskets of various configurations, such as a rubber-only gasket containing a gasket containing a rubber-like elastic body (rubber) alone, a separator integrated gasket in which a gasket containing a rubber-like elastic body is integrally molded in a separator, and a GDL integrated gasket in which a gasket containing a rubber-like elastic body is integrally molded in a GDL (Gas Diffusion Layer).

These gaskets each have features but, in recent years, a demand for a cost reduction has been strong, and therefore the rubber-only gasket capable of satisfying the demand has drawn attention.

The rubber-only gasket is configured as illustrated in FIG. 4A, for example.

More specifically, a gasket 11 is formed into a planar shape (plate shape) as a whole and an outer peripheral seal portion 12 for sealing the entire circumference of the surrounding of a reaction surface of a fuel cell is provided in a planar rectangular frame shape. Moreover, since there is a necessity of dividing the reaction surface and each manifold portion of the fuel cell, inner seal portions 13 are integrally provided inside (each of the four corners) the outer peripheral seal portion 12. The cross-sectional shape of the gasket 11 is formed into a circular cross section as illustrated in FIG. 4B.

PRIOR ART DOCUMENT

Patent Document

Patent Document 1: Japanese Unexamined Patent Publication No. 2014-60133 (see gasket 3 in FIGS. 1, for example)

SUMMARY OF THE INVENTION

Problem to be Solved by the Invention

However, the rubber-only fuel cell gasket 11 has room for further improvement in the following respects.

More specifically, the fuel cell gasket 11 is generally configured so that, while the planar outer shape is set to a size of about 400 mm×about 300 mm, the cross-sectional shape (wire diameter) thereof is set to be as small as about 1 mm to several millimeters. Therefore, the gasket 11 alone is likely to be twisted in carrying or stacking, and therefore the handling workability (handling property) is not good.

In view of the above-described problems, it is an object of the present invention to provide a gasket which is configured so that the handling workability of a rubber-only gasket can be improved and, even when a gasket body and a carrier film adhere to each other, the carrier film can be easily detached from the gasket body.

Means for Solving the Problem

In order to achieve the above-described object, a gasket of the present invention has a combination of a rubber-only gasket body and a carrier film containing a resin film detachably holding the gasket body, in which a gasket holding portion containing a three-dimensional shape deformed along an outer shape of the gasket body is provided in a portion overlapping with the gasket body on a plane in the carrier film and the gasket holding portion containing the three-dimensional shape is formed into a stepped shape in which one side surface of the gasket body is not held and only the other side surface and a lower surface are held.

In the present invention, the handling workability of the gasket is improved by holding the rubber-only gasket body with the carrier film containing a resin film. The gasket body and the carrier film are not bonded to each other, which makes it possible to detach the carrier film from the gasket body to stack only the gasket body in stacking.

The gasket body has a planar shape (plate shape) and the carrier film containing a resin film also has a planar shape (plate shape), and therefore there is a concern that the gasket body cannot be firmly held by the carrier film merely by placing the gasket body on the carrier film. Then, in order to overcome the concern, it is preferable to provide the gasket holding portion containing the three-dimensional shape deformed along the outer shape of the gasket body in the portion overlapping with the gasket body on the plane in the carrier film, and thus the gasket body is three-dimensionally held by the gasket holding portion, and therefore the gasket body can be firmly held by the carrier film.

The gasket body and the carrier film are not bonded to each other as described above but the gasket body and the carrier film adhere to each other in some cases depending on the characteristics in terms of materials, molding processes, and the like of the gasket body. In this case, there is a concern that, when the adhesive force is strong, it becomes difficult to detach the carrier film from the gasket body. Then, the present invention is configured so that the shape of the gasket holding portion is formed into a cantilever type stepped shape in which one side surface of the gasket body is not held and only the other side surface and the lower surface are held, and thus the adhesive area is limited, so that, even when the gasket body and the carrier film adhere to each other, the carrier film can be easily detached from the gasket body.

The gasket of the present invention is used as a fuel cell gasket, for example. Since the number of stack laminations is large in the fuel cell, the gasket is demanded to have a small thickness. The gasket having a small thickness is likely to be twisted, and therefore the handling workability is not good. Therefore, in the field of the fuel cell gasket which has a small thickness and is likely to be twisted as described above, it is very effective to improve the handling workability by combining the gasket body with the carrier film containing a resin film for increasing the efficiency of a stacking operation.

A method for manufacturing the above gasket includes performing, step by step, a process of clamping a mold for molding a gasket body in a state where a carrier film of a planar shape is inserted between parting portions of the mold, a process of molding the gasket body with the mold, and then deforming a part on the plane of the carrier film along a mold cavity inner surface with molding material charging pressure when molding the gasket body to thereby mold a gasket holding portion containing a three-dimensional shape, and a process of opening the mold after molding the gasket body, and then simultaneously taking out the gasket body and the carrier film from the mold. The carrier film has high holding power because the carrier film which originally has a planar shape is partially formed into a three-dimensional shape utilizing the molding material charging pressure and fits with the gasket body in the portion formed into the three-dimensional shape.

Effect of the Invention

According to the present invention, the rubber-only gasket body and the carrier film containing a resin film are combined, and therefore the handling workability of the rubber-only gasket can be improved. Moreover, the shape of the gasket holding portion is formed into the stepped shape in which one side surface of the gasket body is not held and only the other side surface and the lower surface are held, and therefore, even when the gasket body and the carrier film adhere to each other, the carrier film can be easily detached from the gasket body.

BRIEF EXPLANATION OF THE DRAWINGS

FIGS. 1A and 1B are views illustrating a gasket according to an embodiment of the present invention, in which FIG. 1A is a plan view thereof and FIG. 1B is an enlarged cross-sectional view of a principal portion thereof and is an enlarged cross-sectional view along the C-C line of FIG. 1A;

FIGS. 4A and 4B are views illustrating a gasket according to a former example, in which FIG. 4A is a plan view thereof and FIG. 4B is an enlarged cross-sectional view of a principal portion thereof and is an enlarged cross-sectional view along the B-B line of FIG. 4A.

DETAILED DESCRIPTION OF PREFERRED EMBODIMENT

Next, an embodiment of the present invention is described with reference to the drawings.

Figure 1A:
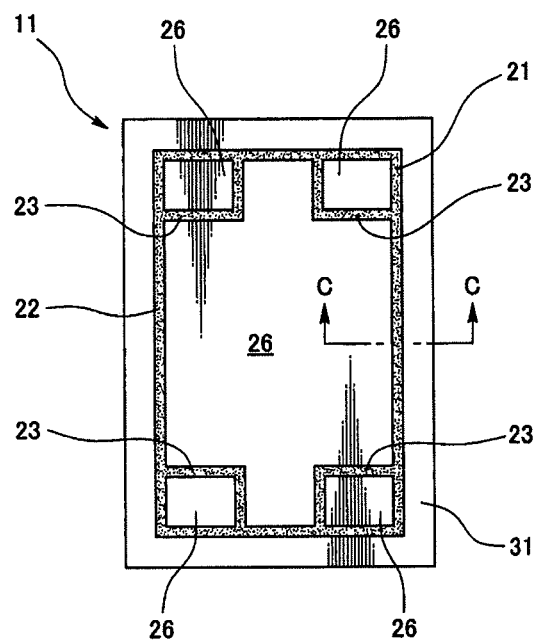

As illustrated in FIG. 1, a gasket 11 according to this embodiment is configured by a combination of a rubber-only gasket body 21 and a carrier film 31 containing a resin film detachably holding the gasket body 21. The gasket body 21 and the carrier film 31 are not bonded to each other but adhere to each other in some cases. The gasket body 21 is used as a fuel cell gasket, for example, in the form of only the gasket body 21 alone by detaching the carrier film 31. The carrier film 31 is also referred to as a carrier sheet or a gasket holding member.

Figure 1B:
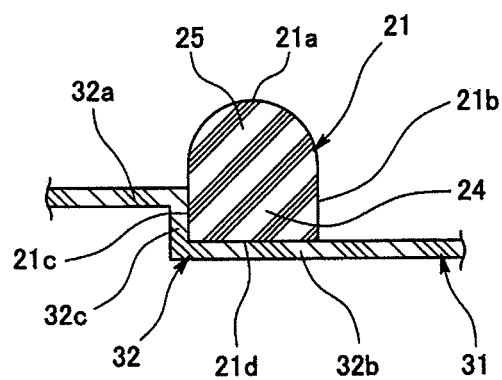

The gasket body 21 is molded into a planar shape (plate shape) as a whole by a predetermined rubber-like elastic body (for example, VMQ, PIB, EPDM, FKM, and the like) and an outer peripheral seal portion 22 sealing the entire circumference of the surrounding of a reaction surface of a fuel cell is provided in a planar rectangular frame shape. Moreover, in order to divide the reaction surface and each manifold portion of the fuel cell, inner seal portions 23 are integrally provided inside (each of the four corners) the outer peripheral seal portion 22. The cross-sectional shape of the gasket body 21 is formed into a D-shaped cross section (horizontal D shape) as illustrated in FIG. 1B, i.e., a shape in which a seal lip 25 of an arc shaped (semicircular) cross section is integrally provided on an upper portion of a gasket base portion 24 of a rectangular shape in the cross section. The reference numeral 26 denotes a penetration portion (space portion) penetrating the gasket body 21 in the thickness direction. The gasket body 21 is molded into a planar rectangular shape as a whole and the planar size is set so that the outer shape is about 400 mm (length)×about 300 mm (width) and the thickness, i.e., wire diameter, is set to about 1 mm.

The carrier film 31 is molded into a planar shape (plate shape) by a predetermined resin film and is molded into a planar rectangular shape larger than the gasket body 21. As the resin film, a 0.2 mm thick polypropylene film is used, for example. The 0.2 mm thick polypropylene film is cut into a planar shape of the above-described size to be used. As the resin film, common resin materials, such as polyethylene and polystyrene, other than polypropylene are usable. Moreover, a film containing engineering plastic, such as polyimide (PA) or polybutyleneterephthalate (PBT), is preferably used. The film containing this kind of engineering plastic makes it difficult for the gasket body 21 and the carrier film 31 to adhere to each other and facilitates the separation of the gasket body 21 and the carrier film 31, even in the case of adhesion. The thickness of the film is preferably set to about 0.1 mm to 0.3 mm depending on the wire diameter or the cross-sectional shape of the gasket body 21.

A gasket holding portion (three-dimensional portion) 32 containing a three-dimensional shape of a deformed shape along the outer shape of the gasket body 21 (outline in the cross-sectional shape of the gasket body 21) is provided in a portion which is a part on the plane of the carrier film 31 and overlaps with the gasket body 21 on the plane.

The gasket holding portion 32 containing the three-dimensional shape is formed as a three-dimensional shape of not a groove shape having one pair of right and left groove side surfaces but a stepped shape in which two plane portions 32a and 32b having different heights continue through a rise portion 32c in the film thickness direction, and thus is provided as a three-dimensional shape of a stepped shape in which an upper surface (upper surface of the seal lip 25) 21a and one side surface (one side surface of the seal lip 25 and the gasket base portion 24) 21b of the gasket body 21 having the D-shaped cross-section (horizontal D shape) are not held and only the other side surface (the other side surface of the gasket base portion 24) 21c and a lower surface (lower surface of the gasket base portion 24) 21d are held.

In the gasket 11 having the above-described configuration, the rubber-only gasket body 21 is held by the carrier film 31 containing a resin film, and therefore the gasket body 21 is hard to be twisted when carrying the gasket 11, and thus is easy to carry. Moreover, the gasket body 21 and the carrier film 31 are not bonded to each other, and therefore the carrier film 31 can be easily detached from the gasket body 21 in stacking. Therefore, the handling workability of the rubber-only gasket 11 can be improved.

Moreover, the gasket holding portion 32 containing the three-dimensional shape is provided on the carrier film 31 and the gasket holding portion 32 containing the three-dimensional shape holds the gasket body 21, and therefore the gasket body 21 is positioned on the plane with respect to the carrier film 31. Therefore, the gasket body 21 does not shift with respect to the carrier film 31 in carrying the gasket 11, and therefore the gasket body 21 can be firmly held by the carrier film 31.

Moreover, the gasket body 21 and the carrier film 31 are not bonded to each other, and therefore the carrier film 31 can be easily detached from the gasket body 21 in stacking as described above. However, when the gasket body 21 is molded in a state where the carrier film 31 is inserted into a mold 41 (FIG. 2) for molding the gasket body 21 as described later, the gasket body 21 and the carrier film 31 adhere to each other due to the fact that the molded gasket body 21 has adhesiveness, for example. The adhesion has low adhesive force such that the detachment by a chucking device can be achieved in many cases. However, when the adhesive force is strong, there is a concern that the carrier film 31 is difficult to be detached from the gasket body 21.

Then, the gasket holding portion 32 is formed into the stepped shape and is formed into the shape in which the upper surface 21a and the one side surface 21b of the gasket body 21 are not held and only the other side surface 21c and the lower surface 21d are held as described above in this embodiment, and therefore this shape makes it easy to detach the carrier film 31 from the gasket body 21 even when both 21 and 31 adhere to each other.

Figure 5A:
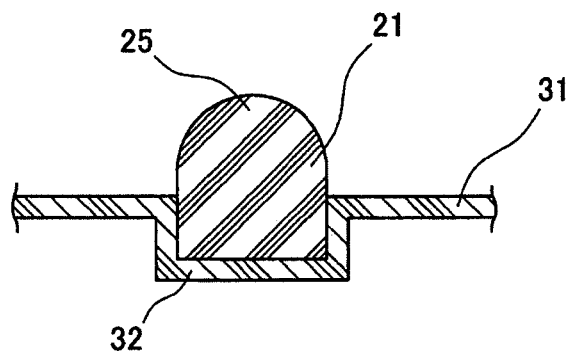
FIGS. 5A and 5B are cross-sectional views of a principal portion of gaskets according to Comparative Examples, relatively.

More specifically, when the shape of the gasket holding portion 32 is formed into a groove shape instead of the stepped shape as illustrated in FIG. 5A as Comparative Example 1, the gasket holding portion 32 of the groove shape holds three surfaces of the one side surface 21b, the other side surface 21c, and the lower surface 21d of the gasket body 21, and therefore the adhesive area is relatively large, and thus the carrier film 31 is difficult to be detached from the gasket body 21. On the other hand, the gasket holding portion 32 is formed into the stepped shape so that only the two surfaces (the other side surface 21c and the lower surface 21d of) of the gasket body 21 are held, and therefore the adhesive area is relatively small in the above-described embodiment. Therefore, the carrier film 31 is easily detached from the gasket body 21.

Figure 5B:
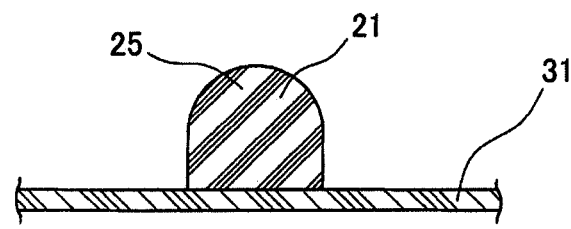

Moreover, when the gasket holding portion 32 containing the three-dimensional shape is omitted and the carrier film 31 keeps a planar shape as illustrated in FIG. 5B as Comparative Example 2, the gasket body 21 cannot be firmly held by the carrier film 31 as described above.

Therefore, the gasket holding portion 32 is formed into the stepped shape, so that the two surfaces (the other side surface 21c and the lower surface 21d) of the gasket body 21 are held as described above as a mean therebetween in this embodiment of the present invention.

Next, a method for manufacturing the gasket 11 is described. For the manufacturing, a mold for extrusion-molding the rubber-only gasket body 21 is used.

Figure 2A:
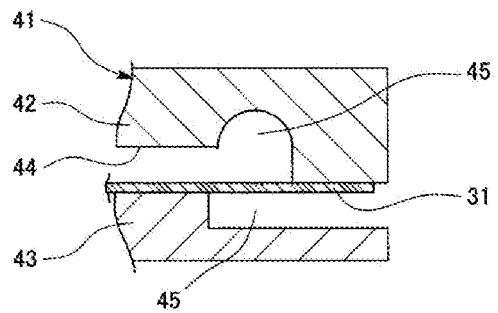
FIGS. 2A-2D are views explaining processes of a method for manufacturing a gasket according to an embodiment of the present invention.

As a process, first, the carrier film 31 of a planar shape cut into a planar shape of a predetermined size is prepared, and then the mold 41 is clamped in a state where the carrier film 31 is inserted between parting portions 44 of the mold 41 as illustrated in FIG. 2A. The mold 41 has a combination of an upper mold (one divided mold) 42 and a lower mold (the other divided mold) 43 and cavity portions 45 are provided one by one corresponding to the parting portions 44 of both the molds 42 and 43. The entire surface of the carrier film 31 originally has a planar shape, and therefore the carrier film 31 is brought into a state of crossing the inside of the cavity portions 45.

Figure 2B:
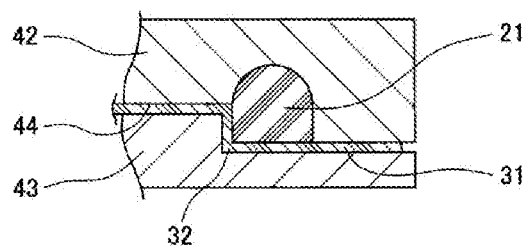

Subsequently, as illustrated in FIG. 2B, a molding material for molding the gasket body 21 is charged into the cavity portions 45, and then heated, for example, to mold the gasket body 21. When the molding material is charged into the cavity portions 45, a part on the plane of the carrier film 31 is pressurized against the inner surface of the cavity portions 45 by the molding material charging pressure, and is deformed (plastically deformed) into a shape along the inner surface of the cavity portions 45, whereby the gasket holding portion 32 containing a three-dimensional shape is molded.

Figure 2C:
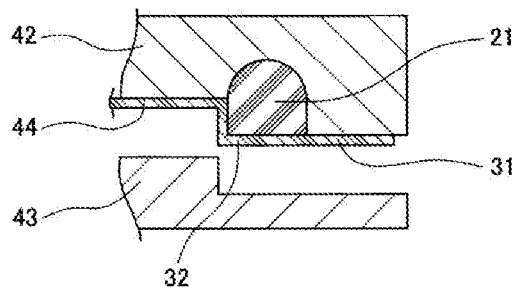
Figure 2D:
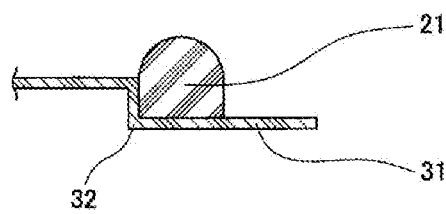

Subsequently, after the molding of the gasket body 21, the mold is opened as illustrated in FIG. 2C, and then the gasket body 21 and the carrier film 31 are simultaneously taken out from the mold 41 as illustrated in FIG. 2D. The gasket body 21 and the carrier film 31 which are taken out are brought into a combination state in which the gasket body 21 is held by the carrier film 31. In the combination state, a product is carried or stored, for example. The gasket body 21 held by the carrier film 31 is hard to be twisted or the like, and therefore the handling workability is improved as compared with a case of handling the gasket body 21 alone.

Figure 3A:
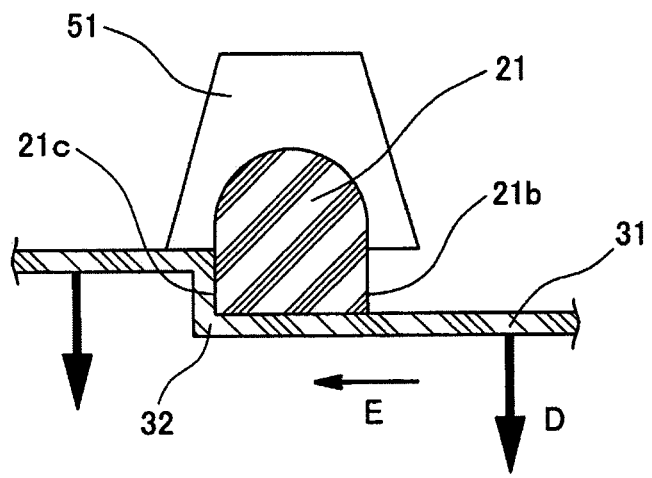
FIGS. 3A and 3B are views explaining a method for handling the gasket according to the embodiment of the present invention.
Figure 3B:
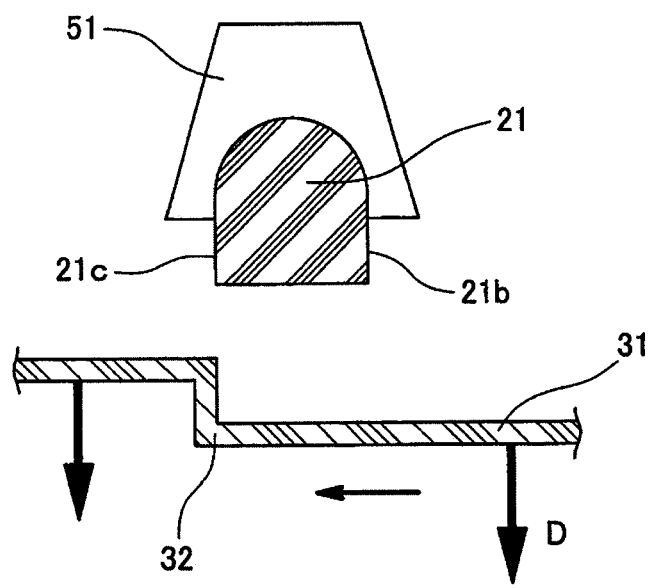
Figure 4A:
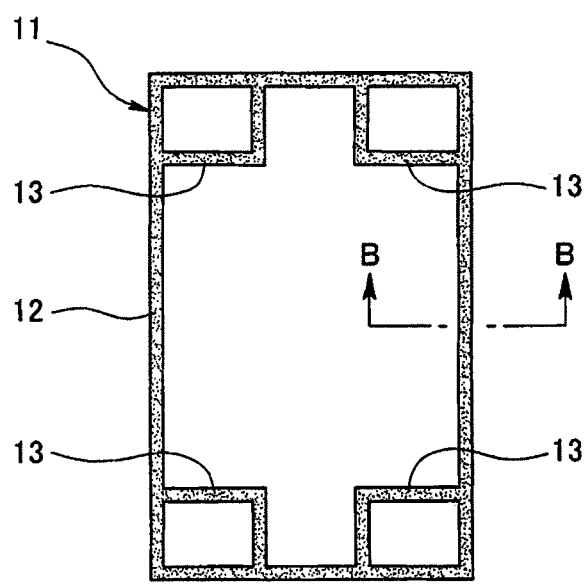
Figure 4B:
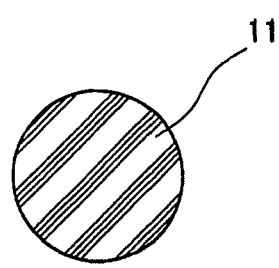

When the gasket body 21 is attached to a fuel cell stack, the gasket body 21 is held with a chucking device 51 or the like in a state where the carrier film 31 is adsorbed and fixed to the side of a base with an evacuation device (which is not illustrated and the evacuation direction of which is indicated by the arrow D) or the like as illustrated in FIG. 3A, and then raised as illustrated in FIG. 3B to be separated from the carrier film 31. By performing the separation in such a manner as to successively peel the gasket body 21 from the one side surface 21b side to the other side surface 21c side in the gasket body 21 (arrow E), the separation is more easily performed.

DESCRIPTION OF REFERENCE NUMERALS 11 gasket
21 gasket Body
21a gasket upper surface
21b one side surface
21c other side surface
21d lower surface
22 outer peripheral seal portion
23 inner seal portion
24 gasket base portion
25 seal lip
26 penetration portion
31 carrier film
32 gasket holding portion
32a, 32b plane portion
32c rise portion
41 mold
42 upper mold
43 lower mold
44 parting portion
45 cavity portion
51 chucking device

What is claimed is:
1. A gasket comprising:
a combination of a rubber-only gasket body and a carrier film containing a resin film detachably holding the gasket body, wherein:
a gasket holder containing a three-dimensional shape deformed along an outer shape of the gasket body is provided in a portion overlapping with the gasket body on a plane in the carrier film, and
the gasket holder containing the three-dimensional shape is formed into a stepped shape in which one side surface of the gasket body is not held by the gasket holder and only another side surface of the gasket body and a lower surface of the gasket body are held by the gasket holder.

2. The gasket according to claim 1, wherein
the gasket body is used as a fuel cell gasket to be incorporated in a fuel cell stack.

3. A method for manufacturing the gasket according to claim 1 comprising:
   clamping a mold that is to mold the gasket body in a state where the carrier film of a planar shape is inserted between parting portions of the mold;
   molding the gasket body with the mold, and then deforming a part on the plane of the carrier film with molding material charging pressure along a mold cavity inner surface when molding the gasket body to thereby mold the gasket holder containing the three-dimensional shape; and
   opening the mold after molding the gasket body, and then simultaneously taking out the gasket body and the carrier film from the mold.

4. A method for manufacturing the gasket according to claim 2 comprising:
   clamping a mold that is to mold the gasket body in a state where the carrier film of a planar shape is inserted between parting portions of the mold;
   molding the gasket body with the mold, and then deforming a part on the plane of the carrier film with molding material charging pressure along a mold cavity inner surface when molding the gasket body to thereby mold the gasket holder containing the three-dimensional shape; and
   opening the mold after molding the gasket body, and then simultaneously taking out the gasket body and the carrier film from the mold.

5. The gasket according to claim 1, wherein
the one side surface of the gasket body and the another side surface of the gasket body are diametrically opposed from one another.

\* \* \* \* \*